May 28, 1968   R. J. KELLERMEIER, JR   3,385,329
APPARATUS FOR REHYDRATING DEHYDRATED PRODUCTS
Filed Aug. 23, 1965
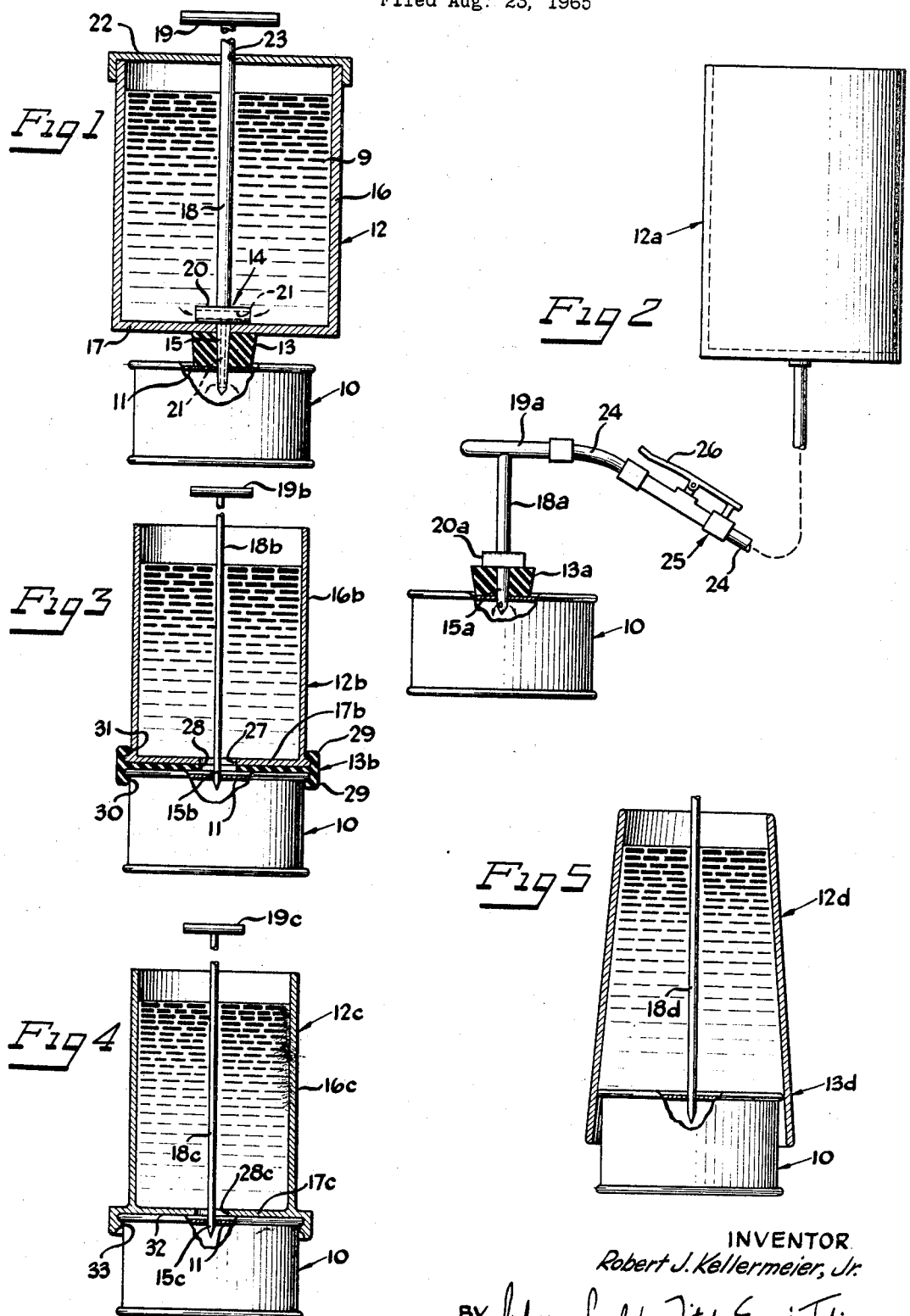
INVENTOR
Robert J. Kellermeier, Jr.
BY Anderson, Luedeka, Fitch, Even & Tabin
ATTORNEYS

United States Patent Office 3,385,329
Patented May 28, 1968

3,385,329
APPARATUS FOR REHYDRATING DEHYDRATED PRODUCTS
Robert L. Kellermeier, Jr., Mount Prospect, Ill., assignor to National Dairy Products Corporation, New York, N.Y., a corporation of Delaware
Filed Aug. 23, 1965, Ser. No. 481,867
7 Claims. (Cl. 141—329)

ABSTRACT OF THE DISCLOSURE

Apparatus is described for restoring liquid content to dehydrated products within a container by providing an annular liquid-tight seal about a puncturable wall portion of a container which permits communication between the container and a liquid-containing region when a sharpened element is moved relative to the seal to pierce the puncturable wall portion of the container.

---

This invention relates generally to apparatus for restoring the normal water content to dehydrated products such as food. More particularly, the invention relates to apparatus for rehydrating foods which have been dehydrated while frozen and then have been packed under vacuum in a container such as a "tin can" having a puncturable wall. In the vacuum packing of dehydrated food, air is evacuated from the fine structure of the food as well as the space around the food so that no gas is present to impede the reentry of water into the food. To take advantage of the absence of gas, it is desirable that only water be permitted to enter the container when the dehydrated food is reconstituted.

The primary object of the present invention is to provide novel rehydrating apparatus for conveniently introducing water to the interior of the evacuated container while avoiding the entry of air prior to or with the water.

Another object is to provide novel rehydrating apparatus which insures the introduction of only water to the container without completely immersing the container, which would often result in contamination of the water prior to its entry into the container.

A further object is to provide novel rehydrating apparatus which is simple to manipulate.

Other objects and advantages of the invention will become apparent from the following detailed description taken in connection with the accompanying drawings in which:

FIGURE 1 is a diametrical vertical sectional view of one form of improved rehydrating apparatus shown in operating position on a food container which is partially broken away;

FIGS. 2, 3, 4 and 5, respectively, are views similar to FIG. 1 and each showing a different modification.

The invention is susceptible of various modifications and alternative constructions some of which are shown in the drawings and described below. It is to be understood, however, that the invention is not intended to be limited by such disclosure. Rather, the aim is to cover all modifications and alternative constructions falling within the spirit and scope of the invention as expressed in the appended claims.

The rehydrating apparatus of the present invention is especially adapted for reconstituting food which has been dried while frozen and then packed under a vacuum in an airtight container 10 having a puncturable wall 11, the vacuum being on the order of 25 to 27 inches of mercury. A suitable container for this purpose is the so-called "tin can" having a cylindrical side wall and flat end walls formed of tin plate, one end wall constituting the puncturable wall in this instance.

Generally, the improved apparatus comprises a liquid-containing vessel 12 for the water 9 for rehydration, seal means 13 engageable with the exterior of the food container to form a liquidtight seal, and means 14 for establishing communication between the interior of the vessel and the interior of the container through a portion of the puncturable wall surrounded by the seal means so that water may flow into the container from the vessel while the seal means remains intact. The communication means includes a sharpened element 15 movable relative to the seal means to pierce the puncturable wall portion surrounded by the seal means.

In one form of the improved apparatus shown in FIG. 1, the liquid-containing vessel 12 is an open-topped can having a cylindrical side wall 16 and a flat bottom wall 17. The seal means 13 in this form is a frustoconical rubber stopper having one end secured against the underside of the bottom wall of the can so that the can and stopper form a unitary structure. A central aperture in the stopper is aligned with a hole cut in the bottom can wall, the stopper being secured to the bottom wall completely around the hole so as to form a liquidtight seal. The other end of the stopper is flat and is adapted for engagement with the puncturable wall 11 of the food container 10 completely around the aperture in the stopper to form a liquidtight annular seal between the stopper and the container.

The piercing element 15 in this form of the improved apparatus is the sharpened lower end of an elongated tool 18 of T-shape with a straight handle 19 at its upper end forming the cross piece of the T. The lower end portion of the tool is small enough to extend through the opening in the bottom wall 17 of the can and the aligned aperture in the stopper. To limit downward movement of the lower end portion of the tool with respect to the stopper, a second cross piece 20 is secured to the tool at a point spaced above the piercing element. The spacing is great enough so that the sharpened point of the piercing element projects beyond the lower end of the stopper as shown in FIG. 1 when the second cross piece is contacting the bottom wall of the container.

The aperture through the stopper 13, while being expansible radially of the stopper to receive the lower end portion 15 of the piercing tool 18, closes to seal against gravitation of the water from the container when the tool is withdrawn from the aperture. To obtain this sealing relation when the tool is withdrawn and still provide for water flow into the container 10 when the tool is inserted through the stopper and into the container, the lower end portion of the tool and the lower cross piece are hollow to provide a passageway 21 between the ends of the lower cross piece and apertures in the side of the lower end portion of the tool at a point spaced slightly above the sharpened point, this aperture being exposed beneath the stopper when the lower cross piece contacts the bottom container wall.

To expose the handle 19 on the upper end portion of the piercing tool 18 for the application of endwise pressure downwardly to force the sharpened point through the puncturable container wall portion 11, the tool is longer than the portion of the vessel 12 disposed above the container. More specifically, the spacing between the two cross pieces is substantially greater than the length of the cylindrical wall 16 of the vessel in this form of apparatus. If desired, the upper end of the vessel may be closed by a removable cover 22 having an aperture 23 in its central portion receiving the elongated tool. In this instance, the cover is formed of a flexible plastic material such as polyethylene fitting over the upper end of the vessel with a snap action, slits (not shown) radiating from the aperture in the central portion of the cover to receive the lower cross piece on the tool.

In the operation of the apparatus of FIG. 1, the vessel 12 is filled with water 9 while the sharpened point on the piercing element 15 is retracted within the stopper 13 to prevent the flow of water out through the side apertures in the lower end portion of the piercing element. The rubber stopper then is placed against the central portion of the top wall 11 of the food container 10 to form an annular seal between the top and the stopper around the central portion of the stopper. A downward pressure then is applied on the handle 19 to force the point downwardly with respect to the stopper and through the top of the container until the lower cross piece 20 engages the bottom wall 17 of the vessel. As soon as the point pierces the container top, the apertures in the tool are exposed within the container for gravitation of water from the vessel through the passageway 21 into the container to fill the vacuum. During this flow, a continuing downward pressure is exerted on the vessel to maintain the seal between the stopper and the food container to prevent the entry of air into the container along with the water. When the container is full, the sharpened point is withdrawn into the stopper and the vessel is removed from the container.

In a second form of apparatus shown in FIG. 2, parts corresponding to parts of the apparatus in FIG. 1 bear similar reference numerals with a suffix a. Like the first apparatus, this modified form includes an open-topped cylindrical vessel 12a and a sealing means in the form of a rubber stopper 13a. The latter, however, instead of being secured to the underside of the bottom wall of the vessel, is separate from the vessel. The means 14 establishing communication between the vessel and the interior of the container includes an elongated puncturing tool 18a similar to that described above plus an elongated flexible tube 24 with a valve 25 intermediate its ends. One end of the tube is secured to the bottom wall of the vessel around a central aperture therein, and the other end of the tube is sealed around one end of the handle cross bar 19a of the T-shaped piercing tool. This end portion of the cross bar and the stem or shank of the tool are hollow to form the passageway of communication between the flexible tube and side apertures on the lower end portion of the tool spaced slightly above the sharpened point, the ends of the lower cross piece 20 in this form being solid. The valve is a normally closed valve having a manually operable lever 26 normally urged to a valve-closed position, but depressible to open the valve for the flow of water from the vessel to the side apertures in the piercing tool.

In the operation of the modified apparatus of FIG. 2, the sharpened piercing element 15a is retracted into the rubber stopper 13a to cover the side apertures and the vessel 12a is filled with water while the valve 25 is closed. The rubber stopper then is placed against the top 11 of the food container 10 and, while downward pressure is maintained on the stopper, a downward pressure is exerted on the handle 19a to force the sharpened point through the stopper and into the top of the container until the lower cross piece 20a engages the top of the stopper. Then, while the downward pressure continues to be exerted on the stopper, the valve lever 26 is manipulated to open the valve and permit water to be drawn into the vacuum in the container. When the container is full, the valve is closed and the sharpened point is retracted into the stopper to cover the side apertures adjacent the point. Water thus is retained between the sharpened point and the valve so that, when the top of the next food container is punctured, this retained water rather than air is drawn into the container.

A third form of improved apparatus is illustrated in FIG. 3 in which parts corresponding to those of the first form bear similar reference characters with a suffix b. In this form, the vessel 12b is upwardly opening with a cylindrical side wall 16b and a flat bottom wall 17b having a central aperture 27. The seal means 13b is in the form of a snap coupling collar of resilient material comprising a flat wall with central aperture 28 and cylindrical peripheral flanges 29 extending axially in opposite directions and having radially and inwardly projecting lips adapted to hook behind and seal against radially and outwardly projecting lips 30 and 31 formed respectively around the upper edge of the container 10 and the lower edge of the cylindrical side wall 16b of the vessel, so that the vessel and the collar then form a unitary structure. The communication means in this form is an elongated piercing tool 18b having a handle 19b at its upper end and a sharpened lower end portion 15b. While this tool conveniently may be a common ice pick, herein, it is an elongated T-shaped tool longer in length than the cylindrical side wall of the vessel so that the handle projects above the vessel for easy manipulation.

In the operation of the third form of improved apparatus, the upper end of the food container 10 and the lower end of the water vessel 12b are snapped into the coupling collar 13b which forms a liquidtight seal with the lips 30 and 31 on the food container and on the vessel. The latter then is filled with water 9 which flows through the central aperture 27 in the bottom wall of the vessel and the aligned aperture in the coupling collar and onto the top wall 11 of the container. This wall then is punctured by extending the sharpened lower end of the piercing tool through the vessel and the coupling collar and forcing the same through the wall. The tool then is withdrawn to permit water to be drawn into the vacuum in the container. When the latter is full, the coupling collar and vessel are removed.

The vessel 12c of the fourth form of improved apparatus shown in FIG. 4 is an upwardly opening cup having a side wall 16c with a flat bottom wall 17c and a downwardly opening bottom recess 32 adapted to receive the upper edge portion of the food container 10 and having an inwardly projecting lip 33 of resilient material adapted to hook around the outwardly projecting lip on the container in the same manner as the lower portion of the coupling collar 13b of FIG. 3. As in the case of the coupling collar, the bottom of the cup of FIG. 4 is formed with a central aperture 28c to receive the sharpened portion 15c of the piercing tool 18c as well as permit water 9 poured into the cup to flow onto the top 11 of the food container. In this construction, the cup and the sealing means form an integral body. The piercing tool in this form is similar to that of FIG. 3 in having a length greater than the extension of the cup above the food container so that the handle 19c projects above the cup for easy manipulation. The operation of this form of apparatus is substantially the same as the third form of FIG. 3.

In another form of the invention shown in FIG. 5 parts corresponding to parts in the original form of FIG. 1 bear the same reference numerals with the suffix d. The liquid-containing vessel 12d in this form is the upper end portion of a tubular sleeve of circular cross section having a slight outward taper from its open upper end to its open lower end. The sealing means 13d in this form is an annular portion of the sleeve spaced from the lower end and having an interior diameter equal approximately to the outer diameter of the lip on the upper edge portion of the food container 10. With this arrangement, the lower end portion of the sleeve is larger in diameter than the upper lip of the food container and the upper end of the sleeve is of smaller diameter. The puncturing tool 18d in this form is similar to that of the last two forms of FIGS. 4 and 5 and is a greater length than that portion of the sleeve projecting above the sealing portion in contact with the upper lip of the food container. Preferably, the vessel in this modification is formed of a material such as polyethylene which is flexible to achieve an effective sealing engagement with the upper lip of the container.

In the use of the open-ended sleeve 12d of FIG. 5, the sleeve is first telescoped over the upper end of the food container 10 and is pressed down tightly thereon so as to form a seal between the upper lip on the container and the annular portion 13d of the sleeve intermediate its ends. The portion of the sleeve above the container then is filled with water and the puncturing tool 18d is inserted to puncture the top of the container. The tool then is withdrawn to permit the water to be drawn into the vacuum within the container. When the container is full, the sleeve is removed.

It will be apparent that, with each of the above forms, it is possible to open the evacuated food container 10 and fill the same with water quickly and easily without immersing the container completely or subjecting the container or the water to contamination by contact with the operator's hands. Moreover, in each form, the sealing means 13 remains intact and, therefore, effective to prevent the entry of air into the container while the container is being punctured and the water is flowing into the container. The first two forms with the stopper and the puncturing tool cooperating to form a seal are advantageous in facilitating removal of the apparatus from the full container without spilling any excess liquid which might have remained in the vessel. The other forms are advantageous, particularly the fifth form, in the simplicity of construction and operation.

I claim:

1. The combination of an upwardly-opening vessel adapted to be supported above a puncturable container to be opened, seal means spaced below the uppermost portion of the vessel and engageable with exterior surfaces of said container to form a liquid-tight annular seal, said seal means and said vessel forming a unitary structure, and an elongated tool having at one end a sharpened element movable relative to said seal to puncture a portion of a wall of said container surrounded by the seal to establish communication for the flow of liquid between the interior of said vessel and the interior of the container while the seal remains intact, said tool being longer than the portion of said vessel above said container to expose the upper end portion of the tool for the application of endwise pressure downwardly to force said sharpened element on the lower end portion of the tool through said container wall portion, said seal means preventing the flow of liquid therethrough when said end portion of the tool is withdrawn from the container.

2. The combination of an upwardly-opening vessel adapted to be supported above a puncturable container to be opened, said vessel having seal means spaced below the uppermost portion of the vessel and engageable with exterior surfaces of said container to form a liquid tight annular seal, said seal means and said vessel forming a unitary structure, and a tool having a sharpened element movable relative to said annular seal to puncture a wall portion of said container surrounded by the seal to establish communication from the flow of liquid from the interior of the vessel into the interior of the container while the seal remains intact, said seal means preventing the flow of liquid therethrough when the tool is removed from the container.

3. The combination of a hollow vessel for containing a liquid, sealing means engageable with exterior surface portions of a closed container having a puncturable wall portion for forming an annular liquid-tight seal surrounding said puncturable wall portion, a sharpened element movable relative to said sealing means for piercing said puncturable wall portion to establish communication between the interior of said vessel and the interior of said container for the flow of liquid into the latter while said seal remains intact, said sharpened element comprising an elongated body having a longitudinal passage therein, a sharpened tip portion and at least one aperture in said body adjacent said tip portion and in communication with said passage, said aperture being disposed in the side of said body and in communication with said vessel through said passage, and said sealing means comprising means for closing said aperture when the tip portion is retracted from the container, so that liquid in the vessel is then prevented from flowing.

4. The combination according to claim 3 wherein said sealing means comprises a body of compressible material having an opening therethrough generally coaxial to said elongated body portion of said sharpened element, the interior wall of said opening closing the aperture in the side of said elongated body when the sharpened element is in its retracted position.

5. An article of manufacture comprising an upwardly-opening vessel adapted to be supported above a container having a puncturable wall portion adapted to be pierced by a piercing tool, said vessel having generally upright wall portions and a bottom wall portion, sealing means forming a unitary structure with said vessel, said sealing means comprising sealing portions disposed adjacent said upright wall portions at said bottom wall portion of the vessel for making liquid-tight engagement with the periphery of the container, said bottom wall portion of the vessel having an aperture therein of sufficient size to permit piercing of the container therethrough and passage of liquid from the vessel to the container, and said sealing means preventing the flow of liquid from the vessel to the container upon removal of the piercing tool from the container.

6. An article of manufacture comprising an upwardly-opening vessel adapted to be supported above a container having a puncturable wall portion, said vessel having generally upright wall portions and a bottom wall portion, sealing means forming a unitary and integral structure with said vessel comprising a collar of resilient material extending downward from the bottom wall portion of the vessel at the periphery thereof, and having an inwardly extending lip spaced downwardly of said bottom wall portion and adapted to hook behind an outwardly extending lip on the periphery of the container, said bottom wall portion of the vessel having an aperture therein of sufficient size to permit piercing of the container therethrough and passage of liquid from the vessel to the container.

7. An article of manufacture comprising an upwardly-opening vessel adapted to be supported above a container having a puncturable wall portion; said vessel having generally upright wall portions, a bottom wall portion, and an outwardly extending lip on the lower periphery of the upright wall portions; sealing means forming a unitary but disengageable structure with said vessel; said sealing means comprising a collar of resilient material having axially spaced inwardly extending lips adapted to hook behind an outwardly extending lip on the upper periphery of the container and on the outwardly extending lip on said vessel; said bottom wall portion of the vessel having an aperture therein of sufficient size to permit piercing of the container therethrough and passage of liquid from the vessel to the container, all other flow from the vessel being prevented by said sealing means.

References Cited

UNITED STATES PATENTS

| 2,424,807 | 7/1949 | Eckman | 141—329 |
| 2,768,660 | 10/1956 | Russell | 141—386 X |
| 3,021,037 | 2/1962 | Parker | 222—498 |

FOREIGN PATENTS

| 823,265 | 12/1951 | Germany. |

LAVERNE D. GEIGER, *Primary Examiner.*

H. S. BELL, *Assistant Examiner.*